(12) United States Patent
Bowen

(10) Patent No.: US 6,790,014 B2
(45) Date of Patent: Sep. 14, 2004

(54) FLUID COOLED DIAPHRAGMS FOR DIAPHRAGM COMPRESSORS

(76) Inventor: John C. Bowen, 2895 Tower Rd., Huntingdon Valley, PA (US) 19006

( * ) Notice: Subject to any disclaimer, the term of this patent is extended or adjusted under 35 U.S.C. 154(b) by 63 days.

(21) Appl. No.: 10/287,839

(22) Filed: Nov. 6, 2002

(65) Prior Publication Data

US 2004/0086397 A1 May 6, 2004

(51) Int. Cl.[7] .............................................. F04B 17/00
(52) U.S. Cl. ............................ 417/392; 417/395; 92/96
(58) Field of Search ................................ 417/392, 394, 417/395; 92/98 R, 96, 80, 82; 60/456

(56) References Cited

U.S. PATENT DOCUMENTS

| | | | | |
|---|---|---|---|---|
| 2,662,478 A | * | 12/1953 | Francois | 417/383 |
| 2,907,339 A | * | 10/1959 | Reinecke et al. | 92/98 R |
| 3,318,250 A | * | 5/1967 | Bowen | 92/98 R |
| 3,661,060 A | * | 5/1972 | Bowen | 92/5 R |
| 3,668,978 A | * | 6/1972 | Bowen | 92/98 R |
| 4,022,114 A | * | 5/1977 | Hansen et al. | 92/98 R |
| 4,270,441 A | * | 6/1981 | Tuck, Jr. | 92/98 R |
| 4,644,847 A | * | 2/1987 | Wolf | 92/98 R |
| 5,244,360 A | * | 9/1993 | Lefebvre | 417/383 |
| 5,335,584 A | * | 8/1994 | Baird | 92/98 R |
| 5,349,896 A | * | 9/1994 | Delaney et al. | 92/98 R |

* cited by examiner

Primary Examiner—Cheryl J. Tyler
(74) Attorney, Agent, or Firm—Zachary T. Wobensmith, III

(57) ABSTRACT

Fluid cooled diaphragms for diaphragm compressors are provided which utilize a multi-layer diaphragm with an upper or gas contacting later, and a bottom or lower layer, which has cooling grooves through which cooling fluid is circulated to reduce the diaphragm temperature. Additionally the upper surface of the diaphragm may be subjected to high loading to indent the surface and produce grooves for gas escape passageways. The gas contacting and grooved layer can be joined over part of the entire surface, or the grooved layer not connected to the other layer. Two or more layers may be used as required.

8 Claims, 6 Drawing Sheets

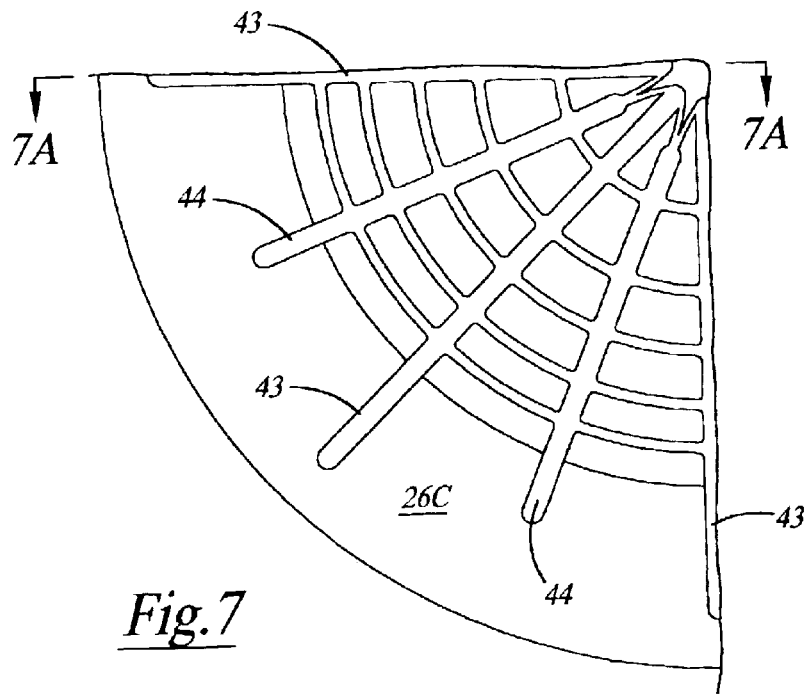
*Fig.7*
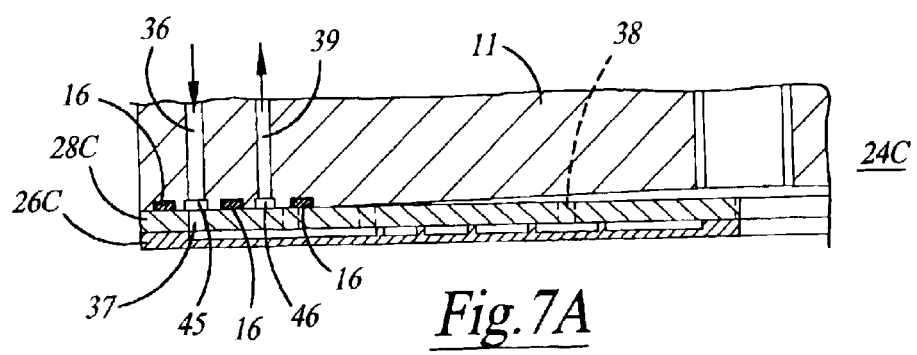
*Fig.7A*
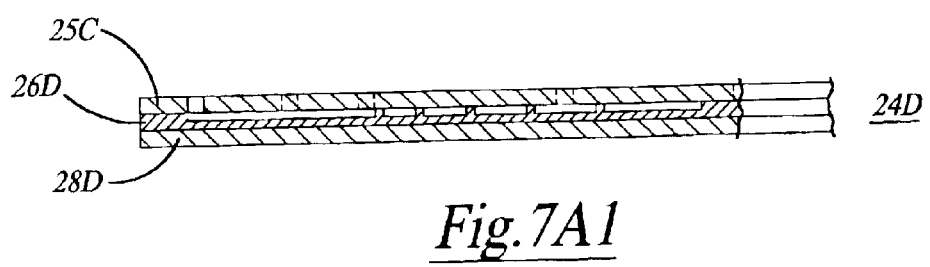
*Fig.7A1*

US 6,790,014 B2

FLUID COOLED DIAPHRAGMS FOR DIAPHRAGM COMPRESSORS

BACKGROUND OF THE INVENTION

Field of the Invention

This invention relates to fluid cooled diaphragms for diaphragm compressors of the multi-layer type wherein there are at least two layers that are grooved to provide passageways for cooling fluid circulation.

It is well known that diaphragm compressors must be carefully designed so that the diaphragm does not become overstressed during its excursion between the two carefully contoured plates that are designed to limit the diaphragms combined tensile, bending and other circumferential stresses. What has not been addressed in my prior patents is that the heat removal system must control the thermal expansion of the diaphragm in the central region, where it is in contact with the gas. This area is where the cavities in the gas and/or liquid support heads are contoured to keep the diaphragm from being overstressed in its motion in compressing the gas. The heat of compression is usually polytropic in nature. At slow speeds, compression approaches isothermal, but as the speed is increased, adiabatic conditions are approached.

This heat quickly makes the inner portion of the diaphragm longer than the cooler outer clamped portion. For example, if the center portion of the diaphragm on a 10" cavity becomes 100 degrees Fahrenheit hotter than the outer rim, the thermal expansion will cause the center portion to become 0.0096" longer if the rate of thermal expansion of 302 stainless steel is 0.0000096 inches/inch/degrees Fahrenheit. This causes the diaphragm to become bowed and to "snap" when it moves through the center of its travel. The bottom of an old style oil can also does this when it snaps between its two positions. The stresses imposed on the diaphragm can possibly be calculated, if the temperatures at all the points on the diaphragm were known, however experience has shown that it this is very difficult to predict, and it is well known that the life of the diaphragm is materially affected by these temperature variations. The denser the inlet gas is and/or the greater the speed of the compressor the more heat is generated in the cavity during the compression cycle in a given amount of time. This heat must be dissipated or the retaining heads and the diaphragm will become quite hot. For example, air compressed from 1000 psig inlet to 5000 psig outlet will theoretically rise in temperature from 72 degrees Fahrenheit to 382 degrees Fahrenheit. This rise does not happen because heat is lost through the head and the diaphragm, however, it does show the potential rise. If this heat is not removed via the head or the diaphragm, these parts will approach this temperature over time when steady state conditions are established.

In general there has been a tendency to run this type of compressor at faster speeds. This means that more energy must be lost per unit time. Discharge temperatures approaching adiabatic are starting to be realized.

To stretch the 10 inch diaphragm 0.0096", the tensile stress would have to be (29,600,000)*(0.0096)/(10)=28,416 psi. This is about the stress level that is used for design purposes for the tensile stresses. This effectively reduces the tensile stress to zero a\t the extreme ends of the motion of the diaphragm, but when the diaphragm moves to the center of its motion, this becomes a compressive stress. Since the thickness of the diaphragm is small compared to its width, buckling occurs. The diaphragm therefore snaps through the mid point. Stresses however are not easily predicted, because the inlet gas cools the diaphragm near its normal off-center location. The diaphragm therefore is not of a uniform temperature. This makes exact prediction of the movement and the attendant stresses difficult.

Various cooling arrangements have been proposed for diaphragm construction such as shown in U.S. Pat. Nos. 4,621,989; 4,636,149; 3,650,639; 3,877,842; and 4,710,109 but none of them provides a satisfactory solution to the problem with metal diaphragms.

The solution to this problem is overcome by removing the heat as quickly as can be done with the given materials of construction.

In my U.S. Pat. Nos. 3,661,060 and 3,668,978, coatings were employed to provide heat insulation properties and protection against fretting corrosion. This technique works for small compressors at low speeds. At higher (>300 RPM) speeds, the problem becomes more difficult as there is less and less time to get rid of a greater amount of heat generated from the larger gas mass flow.

My invention provides cooling passages underneath the primary or gas contacting diaphragm layer for cooling fluid circulation.

SUMMARY OF THE INVENTION

This invention relates to fluid cooled diaphragms for diaphragm compressors which diaphragms are of multi-layer construction with the middle layer having grooves for cooling fluid circulation.

The principal object of the invention is to provide fluid cooled diaphragms for diaphragm compressors.

A further object of the invention is to provide diaphragms of at least two or more layers of construction.

A further object of the invention is to provide diaphragms of multi-layer construction where the layers may be loose, or only partially bonded as well as fully bonded to the gas contacting layer.

A further object of the invention is to provide diaphragms which have an improved service life.

Other objects and advantageous features of the invention will be apparent from the description and claims.

DESCRIPTION OF THE DRAWINGS

The nature and characteristic features of the invention will be more readily understood from the following description taken in connection with the accompanying drawings forming part hereof in which

FIG. 7 is a partial plan view of another embodiment of a diaphragm of my invention;

FIG. 7A is a fragmentary vertical sectional view taken approximately on the line 7A—7A of FIG. 7; and FIG. 7A1 is a view similar to FIG. 7A of a modified diaphragm of my invention.

Figure 1:
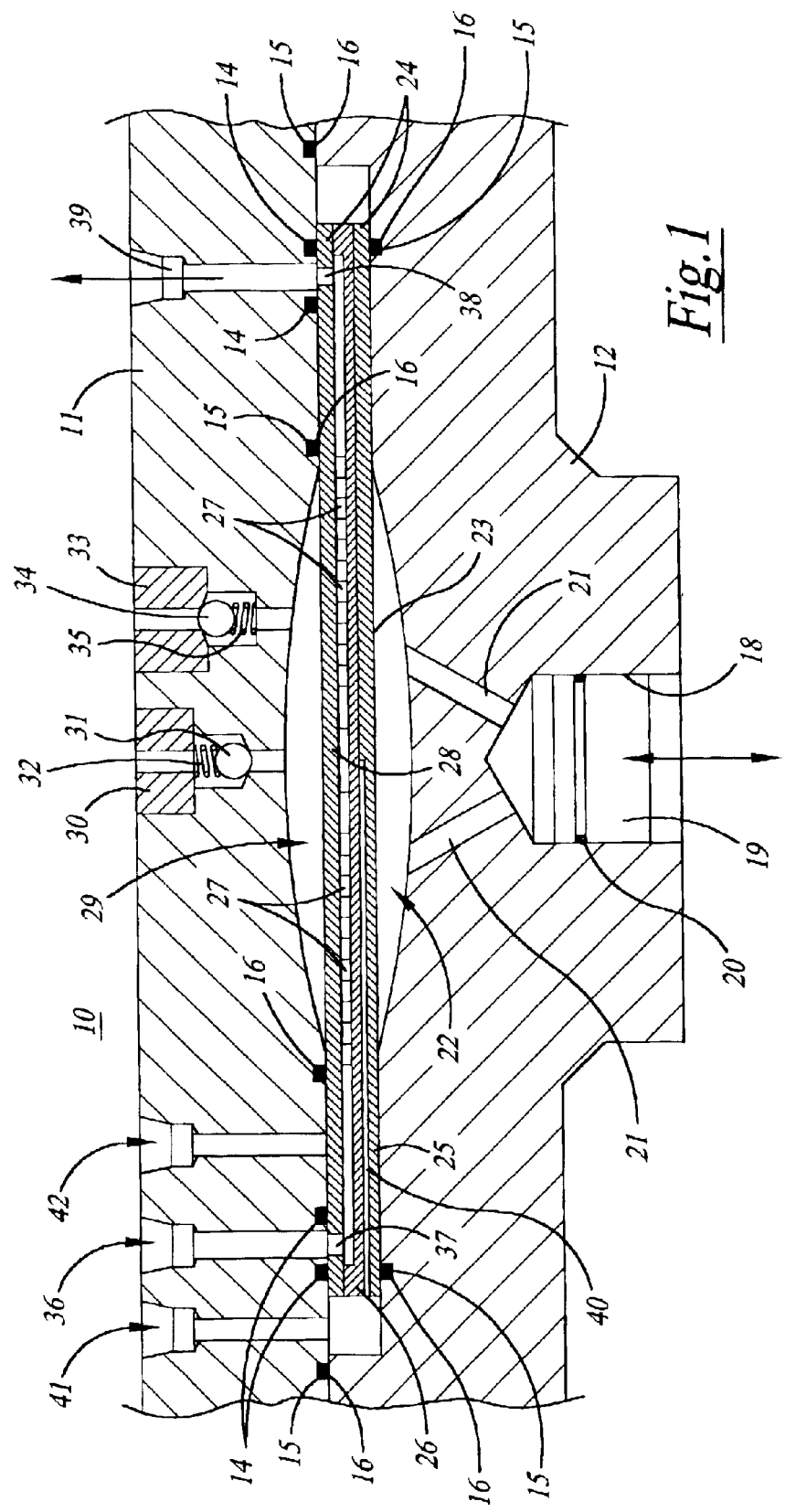
FIG. 1 is a fragmentary vertical section view of a diaphragm compressor showing one embodiment of the diaphragm of my invention.

It should, of course, be understood that the description and drawings herein are merely illustrative and that various modifications and changes can be in the structures disclosed without departing from the spirit of the invention.

Like numerals refer to like parts throughout the several views.

DESCRIPTION OF THE PREFERRED EMBODIMENT

When referring to the preferred embodiment, certain terminology will be utilized for the sake of clarity. Use of such terminology is intended to encompass not only the described embodiment, but also technical equivalents which operate and function in substantially the same way to bring about the same result.

Referring now more particularly to the drawings and FIGS. 1, 2, 7 and 7A, a portion of a diaphragm compressor 10 is therein illustrated. The compressor 10 includes an upper compressor head 11 and a lower compressor head 12 which are secured together in fluid tight relation in well known manner such as by bolts (not shown). The upper compressor head 11 and lower compressor head 12 have grooves 15 therein which contain O-rings 16 of well known type to provide a leak-proof structure.

The lower compressor head 12 has a bore 18 with a reciprocating piston 19 therein, which may have a piston seal ring 20 or may just be a close fit, and which travels in the bore 18 to supply compressed fluid through bores 21 into chamber 22 on the bottom side 23 of a diaphragm assembly 24. The diaphragm assembly 24 as illustrated, is of three layer construction with a bottom layer 25 of well known material, and a center layer 26, of well known material which has grooves 27 milled or etched into its surface to permit cooling fluid to circulate therethrough. An upper layer 28 of well know material is also provided which contacts the gas to be compressed. The upper head 11 has a gas inlet valve 33 of well known type, with a ball 34 and spring 35, and a gas outlet valve 30 of well known type with a ball 32 and spring 31.

The upper layer 28 and center layer 26 can be separate or fastened together in well known manner such as gluing or brazing. If desired the diaphragm 24 may be of four layers (not shown) as described in my prior U.S. Pat. No. 3,661,060 with two layers on the upper or process fluid side.

The upper compressor head 11 has a cavity 29 to accommodate the movement of the diaphragm assembly 24.

The upper compressor head 11 is provided with a port 36 connected to a source of cooling fluid (not shown) which through hole 37 provides the fluid to grooves 27 (FIG. 2) or grooves 43 (FIG. 7) which will be described. Holes 38 are arranged to line up with the ends of grooves 44 to be described. In the case of FIG. 7A there are grooves 45 and 46 in the lower surface of the head, which allow communication of coolant from ports 36 and 39 with the holes 37 and 38. In the case of FIG. 1 there are no grooves 45 and 46 as the O rings 14 surround the openings 37 and 38.

The bottom layer 25 is provided with a groove 40 so that any leakage from a failed layer is directed to port 41. Port 42 may be added to pick up any seal leakage.

While the diaphragm 24 is shown with a three layer construction, it could be of two layer construction (not shown) with an upper diaphragm layer (not shown), which can be solid or grooved along with a lower diaphragm layer (not shown) which can be solid or grooved so that the pair acting together provide coolant passageways.

Figure 2:
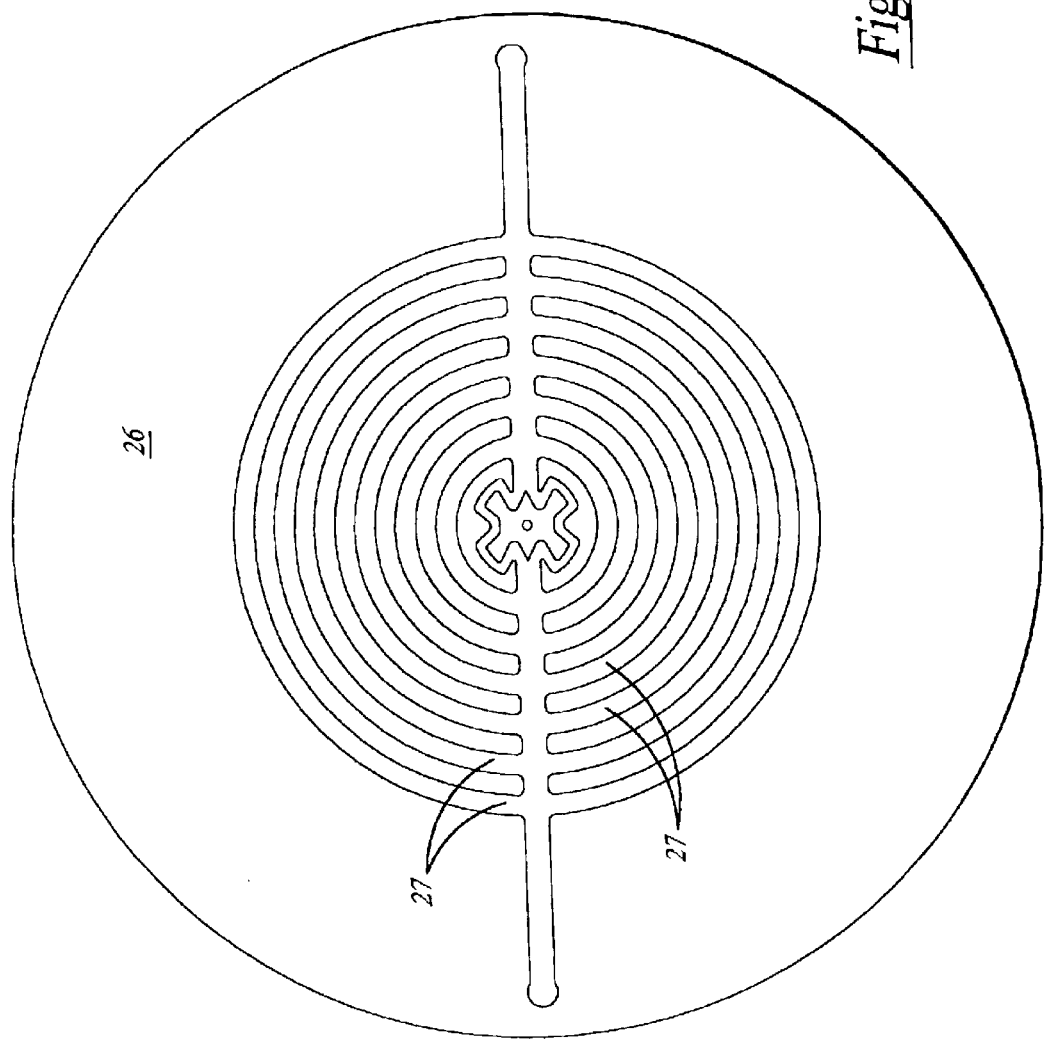
FIG. 2 is a plan view of one embodiment of a diaphragm of my invention.
Figure 3:
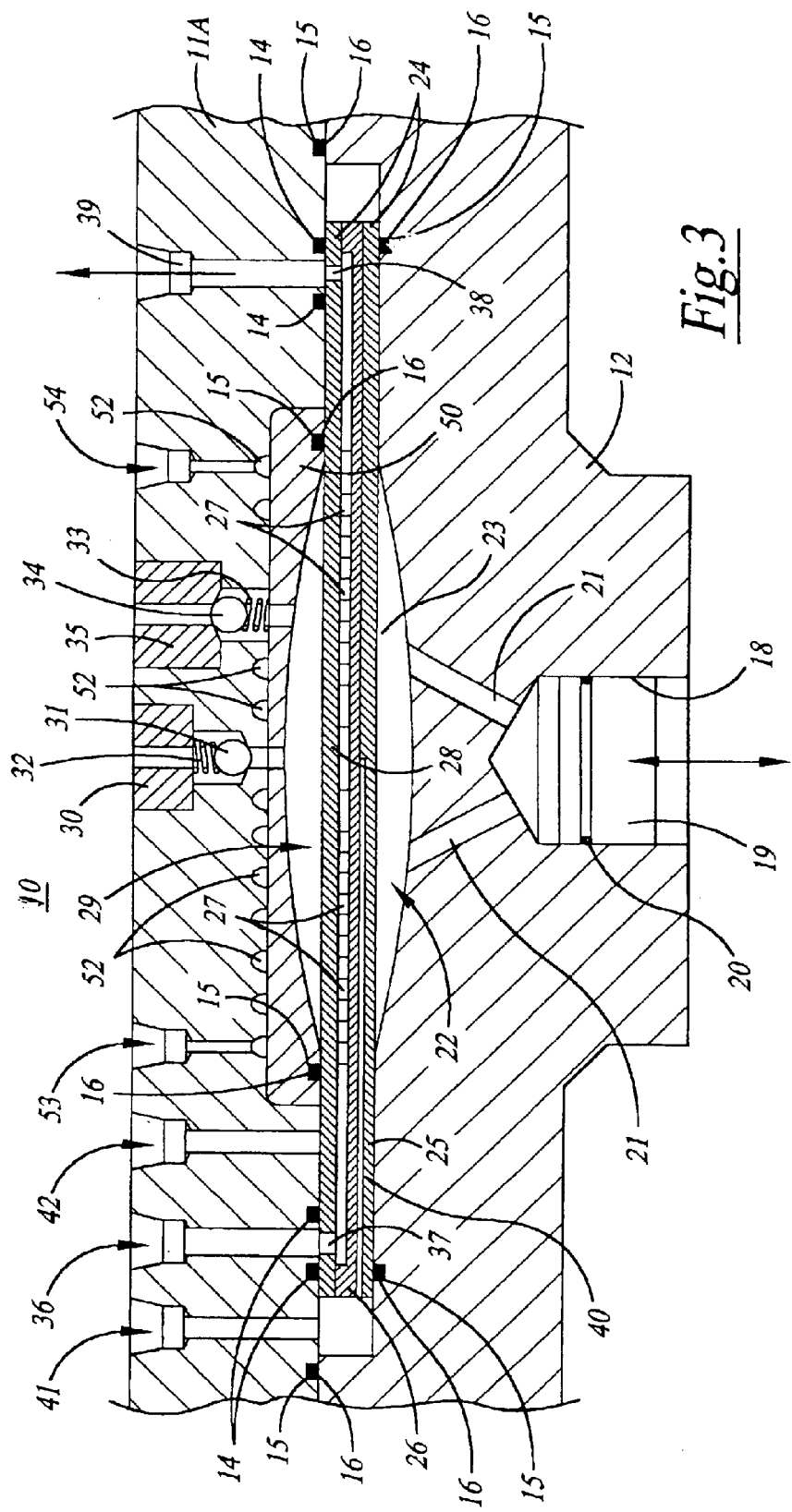
FIG. 3 is a view similar to FIG. 1 of a modification of the embodiment of my invention.

Referring now to FIG. 3, a modification of the embodiment of the invention as shown in FIGS. 1 and 2 is therein illustrated. The lower head 12 and the diaphragm assembly 24 are the same as in FIG. 1, however the upper head 11A is modified to provide additional cooling of the diaphragm assembly 24. The upper head has an insert 50 which is formed to provide a cavity 29 to accommodate the movement of diaphragm 24. The upper head 11A has a plurality of grooves 52 therein with a fluid inlet passageway 53 and a fluid outlet passageway 54 so that cooling fluid may be circulated through the grooves 52 to provide additional cooling.

Figure 4:
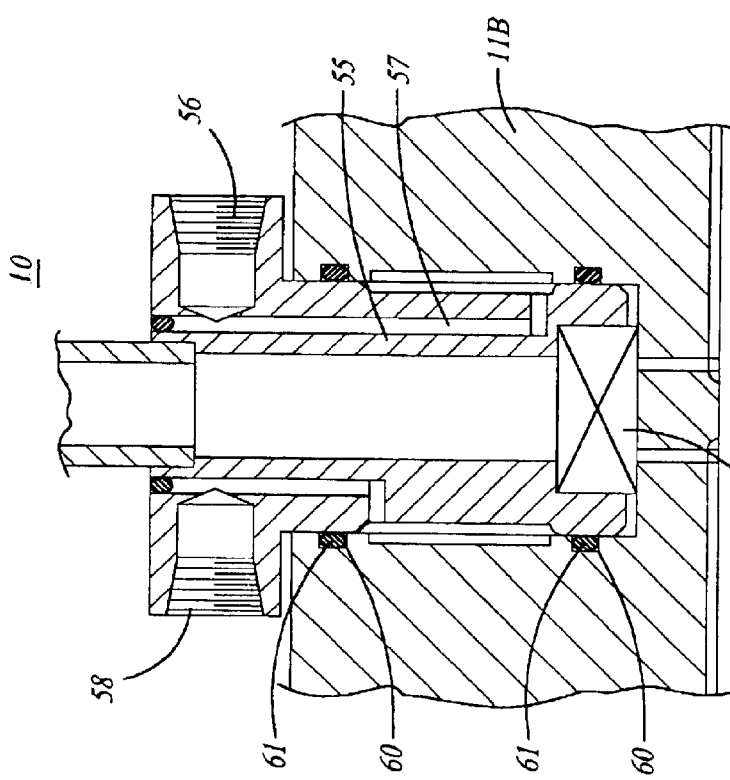
FIG. 4 is a fragmentary vertical sectional view of another modification of my invention.

Referring now more particularly to FIG. 4 another modification of my invention is illustrated wherein the discharge gas outlet valve 30 in upper head 11B has a sleeve 55 therearound, which has a coolant inlet passageway 56 to allow coolant to flow to a passageway 57 in sleeve 55 around the outwardly flowing hot compressed gas and out through passageway 58 back to the coolant supply (not shown).

Upper head 11B has two grooves 60 surrounding sleeve 55 with O-ring seals 61 therein.

Figure 5:
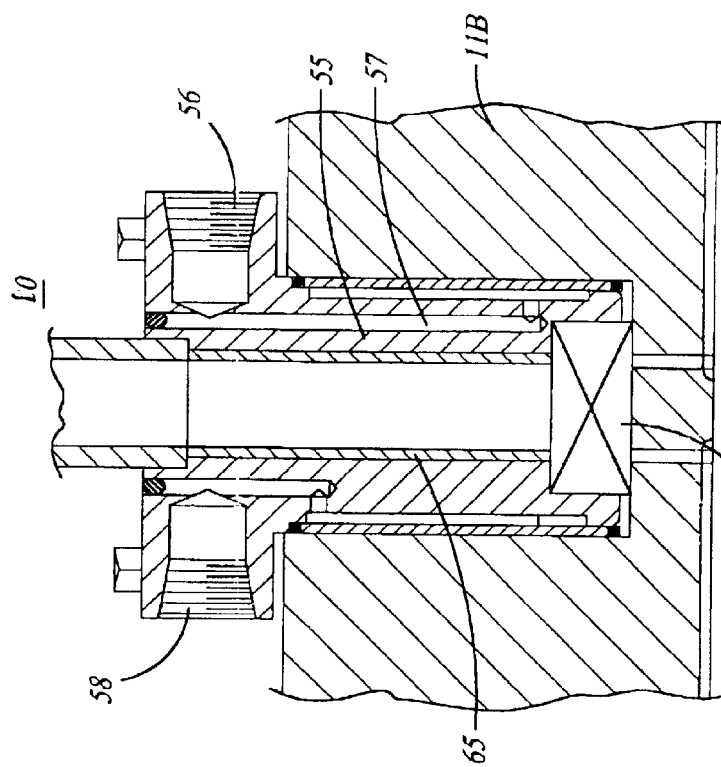
FIG. 5 is a fragmentary vertical sectional view of another modification of my invention.

Referring now more specifically to FIG. 5 the outlet valve 30 is similar to that described for FIG. 4 except that a thermal insulating sleeve 65 of well known type is provided in the sleeve 55 to reduce heat transfer from the hot compressed gas to the gas head 11B and outlet valve 30. In this case a separate cylindrical sleeve is sealed to 55.

Figure 6:
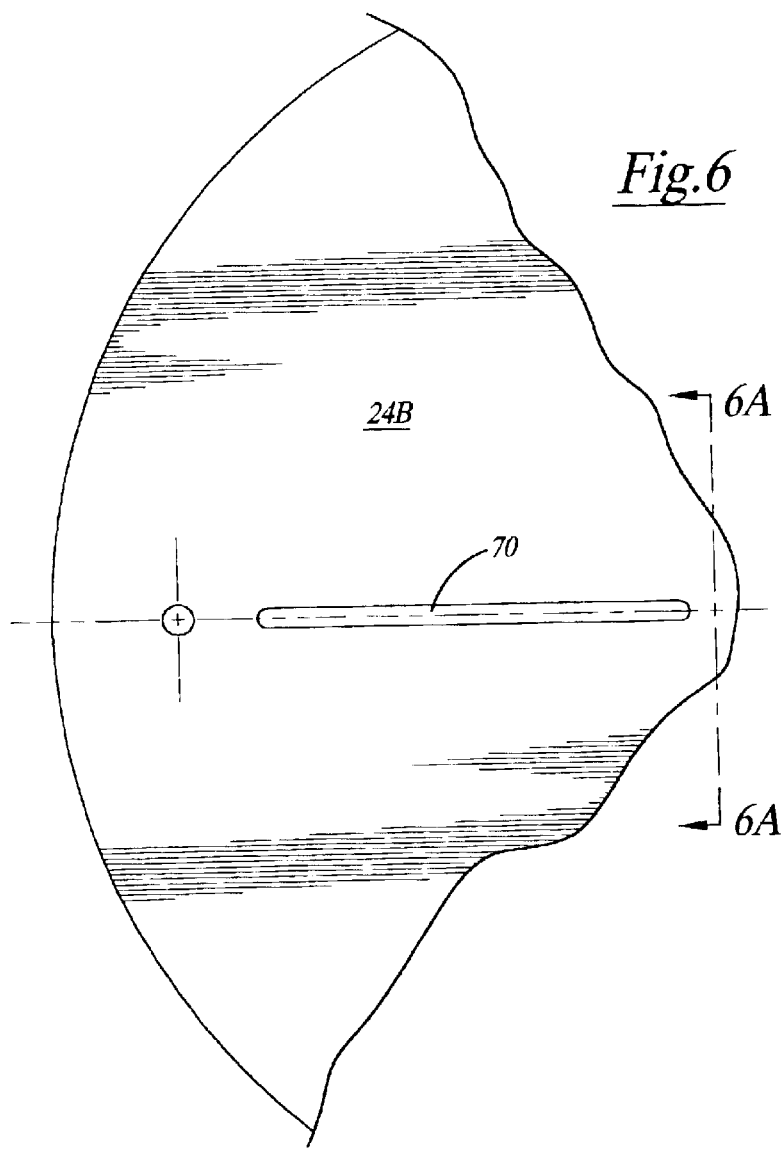
FIG. 6 is a partial plan view of an additional embodiment of my invention.
Figure 6A:
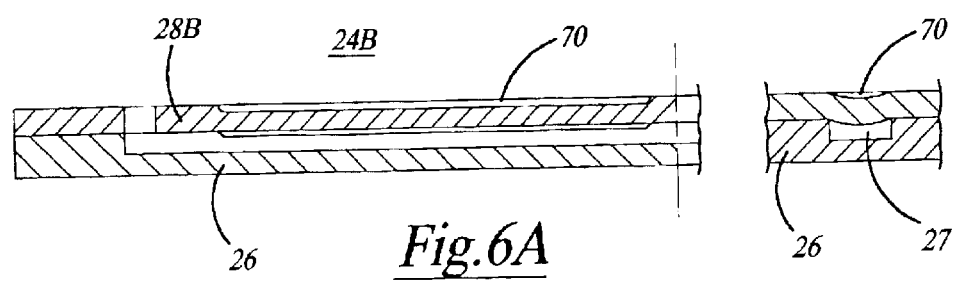
FIG. 6A is a vertical sectional view taken approximately on the line 6A—6A of FIG. 6.

Referring now more particularly to FIGS. 6 and 6A another modification to the diaphragm 24B is illustrated.

The upper or gas contacting layer 28B has been modified by high loading to indent the surface thereby providing grooves 70 therein which act as gas escape passage ways improving the gas flow and the diaphragm cooling. The grooves alternatively are milled or etched in the surface.

Referring now more particularly to FIGS. 7 and 7A a modified diaphragm assembly 24C is therein illustrated. In FIGS. 7 and 7A the upper layer 28C and center layer 26C are joined around the periphery which allows for slight movement between the surfaces and therefore greater heat transfer. The diaphragm layer 26C is illustrated with grooves 43 and 44, with grooves 43 being longer than grooves 44.

Referring now more particularly to FIG. 7A1 another diaphragm assembly 24D is therein illustrated wherein the upper layer 25C, the center layer 26D and the bottom layer 28D are not connected with the center layer 26D grooved as described above.

It should also be understood that there could be a fourth diaphragm layer in the assembly of diaphragms, with slots to allow leak detection, which follows the teachings of my prior patents rather than the structure of a diaphragm assembly like 24D.

It will thus be seen that structure has been provided with which the objects of the invention are achieved.

I claim:

1. A fluid cooled diaphragm for diaphragm compressors which have a lower head and an upper head connected together with a gas inlet and outlet check valves for gas compression, a diaphragm between the upper and lower heads, fluid pressure means in the lower head to provide fluid pressure to the diaphragm the improvement which comprises, said diaphragm being of multi-layer construction, having at least an upper layer, and a lower layer, at least one of which layers is grooved for coolant flow, said at least one grooved layer having a plurality of grooves therein, said at least one grooved layer having inlet and outlet cooling ports therein, a source of coolant connected to said inlet port to provide coolant to circulate through said grooves and out said coolant outlet port.

2. A diaphragm compressor as defined in claim 1 wherein said lower diaphragm layer has grooves therein.

3. A diaphragm compressor as defined in claim 1 wherein said upper compressor head has groove means to allow coolant to be circulated therethrough.

4. A diaphragm compressor as defined in claim 1 wherein said gas outlet check valve has coolant circulating means to allow coolant to cool the gas passing through the outlet valve.

5. A diaphragm compressor as defined in claim 1 in which said gas outlet valve has a thermal insulating sleeve therein.

6. A diaphragm compressor as defined in claim 1 in which said upper diaphragm layer has grooves in its upper gas contacting surface.

7. A diaphragm compressor as defined in claim 1 in which a center diaphragm layer is joined to said upper layer and said lower layer around its periphery.

8. A diaphragm compressor as defined in claim 1 in which said diaphragm layers are not joined together.

* * * * *